United States Patent [19]
Penrod

[11] Patent Number: 5,220,333
[45] Date of Patent: Jun. 15, 1993

[54] METHOD AND APPARATUS FOR DETERMINING UNIVERSAL COORDINATED TIME FROM LORAN-C TRANSMISSIONS

[75] Inventor: Bruce M. Penrod, Weir, Tex.

[73] Assignee: Austron Inc., Austin, Tex.

[21] Appl. No.: 907,673

[22] Filed: Jul. 2, 1992

[51] Int. Cl.$^5$ .............................................. G01S 1/24
[52] U.S. Cl. ..................................... 342/389; 368/47
[58] Field of Search .................... 342/389; 368/47, 187

[56] References Cited
U.S. PATENT DOCUMENTS

| | | |
|---|---|---|
| 4,161,730 | 7/1990 | Anderson . |
| 4,268,830 | 5/1981 | Brodeur . |
| 4,636,795 | 1/1987 | Dano . |
| 4,999,638 | 3/1991 | Schick . |

OTHER PUBLICATIONS

Austron Timing Reference Handbook, 1988, Austron, Inc., pp. 27-30.

Primary Examiner—Theodore M. Blum
Attorney, Agent, or Firm—Arnold, White & Durkee

[57] ABSTRACT

A method and apparatus for determining Universal Coordinated Time from Loran-C transmissions at at least two Group Repetition Intervals. With time known to within a few seconds of Universal Coordinated Time, and position known to within approximately five miles, the present invention permits time transfer substantially to Universal Coordinated Time by receiving first and second Loran-C transmissions at first and second Group Repetition Intervals. Then, a coincidence interval between the two Group Repetition Intervals is calculated, and time is transferred to coincide substantially with Universal Coordinated Time based on the calculated coincidence interval.

15 Claims, 8 Drawing Sheets

METHOD AND APPARATUS FOR DETERMINING UNIVERSAL COORDINATED TIME FROM LORAN-C TRANSMISSIONS

BACKGROUND OF THE INVENTION

The present invention relates to the determination of Universal Coordinated Time from Loran-C transmissions.

The transmission times of Loran-C pulses are precisely controlled relative to the ensemble of atomic frequency standards maintained by the United States Naval Observatory (USNO) in Washington, D.C. This network of USNO clocks is in turn compared with those of other international timekeeping laboratories such as the Bureau International des Poids et Mesures (BIPM) in Paris, France and the National institute of Standards and Technology (NIST) in Boulder, Colo. Using this global approach to clock intercomparison, along with sophisticated clock weighting algorithms, these and other laboratories contribute to the existence and maintenance of Universal Coordinated Time (UTC).

Due to the pulse modulation scheme of Loran-C, skywave phase skew is avoided if excessive delay in front-end band pass filters is avoided and only the first thirty microseconds of the pulses are used. Modern Loran-C receivers are able to identify the zero crossing at the end of the third cycle of a Loran-C pulse, and track it with 100 nanosecond RMS error assuring optimum time of arrival measurement stability.

Based on the precise transmission times of the Loran-C pulses along with the ability of Loran-C receivers to accurately track the correct cycle, transfer of UTC to remote locations is made possible with knowledge of two parameters: 1) the next transmission Time of Coincidence (TOC) of a Loran-C pulse group with a UTC second (a periodic event occurring every Chain Coincidence Interval (CCI) seconds); and 2) the combined knowledge of UTC, receiver delay and propagation path delay accurate to less than one Group Repetition Interval (GRI) of the Loran-C pulses.

Given an accurate position and careful propagation path modeling, the attainable time transfer accuracy via Loran-C is limited to the one to two microsecond level of inaccuracy in the path model. Depending on the range to the transmitter and the type of terrain between the receiver and transmitter, the stability of the Loran-C arrival times may vary from 100 to 500 nanoseconds, RMS.

All Loran-C chain timing is referenced to 00:00:00 hours (UTC), Jan. 1, 1958, the common epoch for all Loran-C transmissions. Each Loran-C chain broadcasts at a particular GRI. As specified, these GRI's may vary from 0.04 to 0.09999 seconds in increments of 10 microseconds. However, no Loran-C chains have made use of the 10 microseconds resolution in GRI, and all have been restricted to GRI's which are integer multiples of 100 microseconds.

The fundamental period of the transmissions is doubled to twice the GRI by application of the Phase Code to the eight (nine for master transmitters) pulses within each group. An alternating Phase Code either A or B is applied to each pulse group. Phase Code A began at the epoch, in the first GRI of each Loran-C chain, and is applied in all odd GRI's. Phase Code B began one GRI later in the second GRI of each Loran-C chain and is applied in all even GRI's.

By knowing this common epoch, the GRI, and the number of UTC leap seconds which have occurred since the epoch, the TOC's of the Loran-C transmissions with the UTC seconds may be computed. At the same time, it can also be determined whether the TOC will be with an even or odd Phase Coded GRI. Since a Loran-C receiver can determine from the Phase Code whether an even or odd GRI has been received, if the combination of UTC time and propagation path delay is known to within one GRI, then the Loran-C pulse group coincident with the UTC second may be unambiguously detected. The detection of this coincident transmission then allows, as described above, transfer of UTC to the one microsecond level of accuracy. In this way, knowing correct real time to a relatively course accuracy, (40 to 99.99 milliseconds), the Loran-C TOC synchronization technique refines this initial time accuracy to the one microsecond level (assuming an accurate position and careful receiver delay calibration and propagation path modeling).

By using a single Loran-C transmission, knowledge of accurate position is not crucial to the determination of the proper pulse group since the maximum propagation path delay for usable transmitters is typically less than 10% of the GRI. Unambiguous coincident pulse group determination is dominantly dependent on the initial UTC accuracy. Of course, the ultimate accuracy of the transfer is directly dependent upon how accurately the receiver position is known.

However, this single Loran-C transmission TOC synchronization technique requires the provision of real time to the receiver with less than 100 milliseconds of error from UTC. Such accuracy requires some external real time clock having a high level of sophistication. Providing such accurate time to the receiver is a recurring problem any time loss of power to the receiver has occurred.

It would therefore be desirable to relax the accuracy requirements of the real time clock maintained at a receiver location, while preserving the ability to synchronize time maintained at the receiver to UTC.

SUMMARY OF THE INVENTION

The apparatus and method of the present invention, in large part, solves the above-noted discrepancies in prior approaches to establishing Universal Coordinated Time at a remote location. The present invention provides a stand-alone approach to accurately establish UTC time using Loran-C transmissions which does not require high initial time accuracy.

In accordance with an embodiment of the present invention, two Loran-C transmissions broadcasting at different GRI's are observed. These transmissions can be either from one dual rated Loran-C transmitter or from two distinct Loran-C transmitters. The transmissions from these two Loran-C chains will coincide periodically. The first time this would have happened was at the common epoch at New Year 1958. The period between these subsequent coincidences between the GRI's is termed herein the Cross Chain Coincidence Interval (CCCI). The CCCI is computed from the two GRI's. As long as the CCCI is much greater than either GRI (a normal condition of Loran-C system operation), the initial time accuracy can be greatly relaxed. Using the present invention, using two Loran-C transmitters, initial time accuracy must be known only to less than one-half of the CCCI (typically greater than hundreds of GRI's), which can range from 13 to 86 seconds with the Loran-C chains in North America.

If a dual rated transmitter is not available, the sum of the errors in the receiver position and propagation path modeling must be less than 25 microseconds (equivalent to a position accuracy of about 5 miles).

Also in accordance with the present invention, more than two Loran-C transmissions broadcasting at different GRI's can be observed. For example, three transmissions can be received, for example, two from a dual rated Loran-C transmitter, and a third from a distinct Loran-C transmitter. The transmissions from these three Loran-C chains will coincide periodically. In accordance with the present invention, the CCCI is computed for the first and second chain, and the CCCI is also computed for the second and third chain. Then, using these two CCCI's, a Compound Cross Chain Coincidence Interval (CCCCI) is computed. From this CCCCI, UTC can be established. Using this aspect of the present invention, with three Loran-C transmitters, initial time accuracy need only be known to within the range of from 3960 to 85,684 seconds (1 hour, six minutes to 23 hours, forty-eight minutes, four seconds) with the Loran-C chains in North America.

Compared to the prior single Loran-C chain method of establishing UTC time, the present invention reduces the initial time accuracy requirement by several orders of magnitude. With activation of the Mid-Continent Loran-C chains in 1990-91, virtually all of North America now is capable of receiving Loran-C transmissions at two GRI's from dual rated transmitters, and much of North America is capable of receiving Loran-C transmissions at three or more GRI's. Time to a few seconds accuracy is readily available via audio means, for example, by radio or telephone communication to WWV or WWVB, and knowledge of a receiver position to five mile accuracy is readily attainable from topographical maps, or can be obtained from the Loran-C receiver itself when signals from at least 3 Loran-C transmitters are available.

With practice of the present invention, after initially setting the local time base, and providing an initial position accurate to 5 miles, automatic time transfer using Loran-C transmissions is possible to within 25 microseconds of UTC. Automatic time transfer to the one microsecond level can be accomplished using the present invention, with knowledge of accurate receiver position, and well calibrated receiver delay.

In addition, with use of an inexpensive battery powered quartz clock (accurate to a few parts per million in a benign ambient temperature environment), operator unaided recovery of UTC after power outages lasting less than a few days is achievable.

In general, the present invention can correct a timekeeping device, accurate to within a few seconds of UTC by receiving a first Loran-C transmission having a first Group Repetition Interval, receiving a second Loran-C transmission having a second Group Repetition Interval, calculating a coincidence interval between the first and second Group Repetition Intervals, and correcting the timekeeping device using the calculated coincidence interval.

More particularly, in accordance with the present invention, a next time of cross chain coincidence is calculated from the cross chain coincidence interval. Then, the next actual cross chain coincidence is detected and compared with the calculated next time of cross chain coincidence. Depending upon this comparison, the time keeping device can be set substantially to UTC.

In addition, the cross chain coincidence intervals are calculated, in accordance with the present invention, by determining a Greatest Common Divisor (GCD) between two Group Repetition Intervals (in units of 100 $\mu$S) and dividing the product of the two GRI's by the GCD. This produces the minimum interval in units of 100 $\mu$S required for pulses from each Loran-C transmitter to coincide with one another. For example:

$$CCCI = \frac{GRI1 * GRI2}{G.C.D.}$$

The apparatus of the present invention includes a Loran-C receiver which is capable of receiving at least two Loran-C transmissions. The apparatus also includes a data processor which is used to calculate, from these two transmissions, a cross chain coincidence interval, from which is calculated the next time of cross chain coincidence. Then, a comparator is used to compare the calculated time of cross chain coincidence with the next cross chain coincidence detected. As a result of the comparison, a local real time clock is adjusted to UTC, and a local oscillator is adjusted to produce one pulse per second, synchronized with UTC, which is thereafter used to maintain local UTC time.

These and other features and advantages of the present invention will become apparent to those of skill in this art, with reference to the appended drawings and following detailed description.

DETAILED DESCRIPTION OF THE INVENTION

| | |
|---|---|
| BIPM | Bureau International des Poids et Mesures, Paris, France |
| CCC | Cross Chain Coincidence |
| CCCCI | Compound Cross Chain Coincidence Interval |
| CCCI | Cross Chain Coincidence Interval |
| CCI | Chain Coincidence Interval |
| GCD | Greatest Common Divisor |
| GRI | Group Repetition Interval |
| IRQ | Interrupt Request |
| Loran | Long Range Navigation |
| NIST | National Institute of Standards and Technology, Boulder, Colorado |
| PDOP | Position Dilution of Precision |
| PPS | Pulses Per Second |
| RAM | Random Access Memory |
| RMS | Root Mean Square |
| TOC | Time of Coincidence |
| TOCCC | Time of Cross Chain Coincidence |
| USNO | United States Naval Observatory, Washington, D.C. |
| UTC | Universal Coordinated Time |

B. Detailed Description

Figure 1:
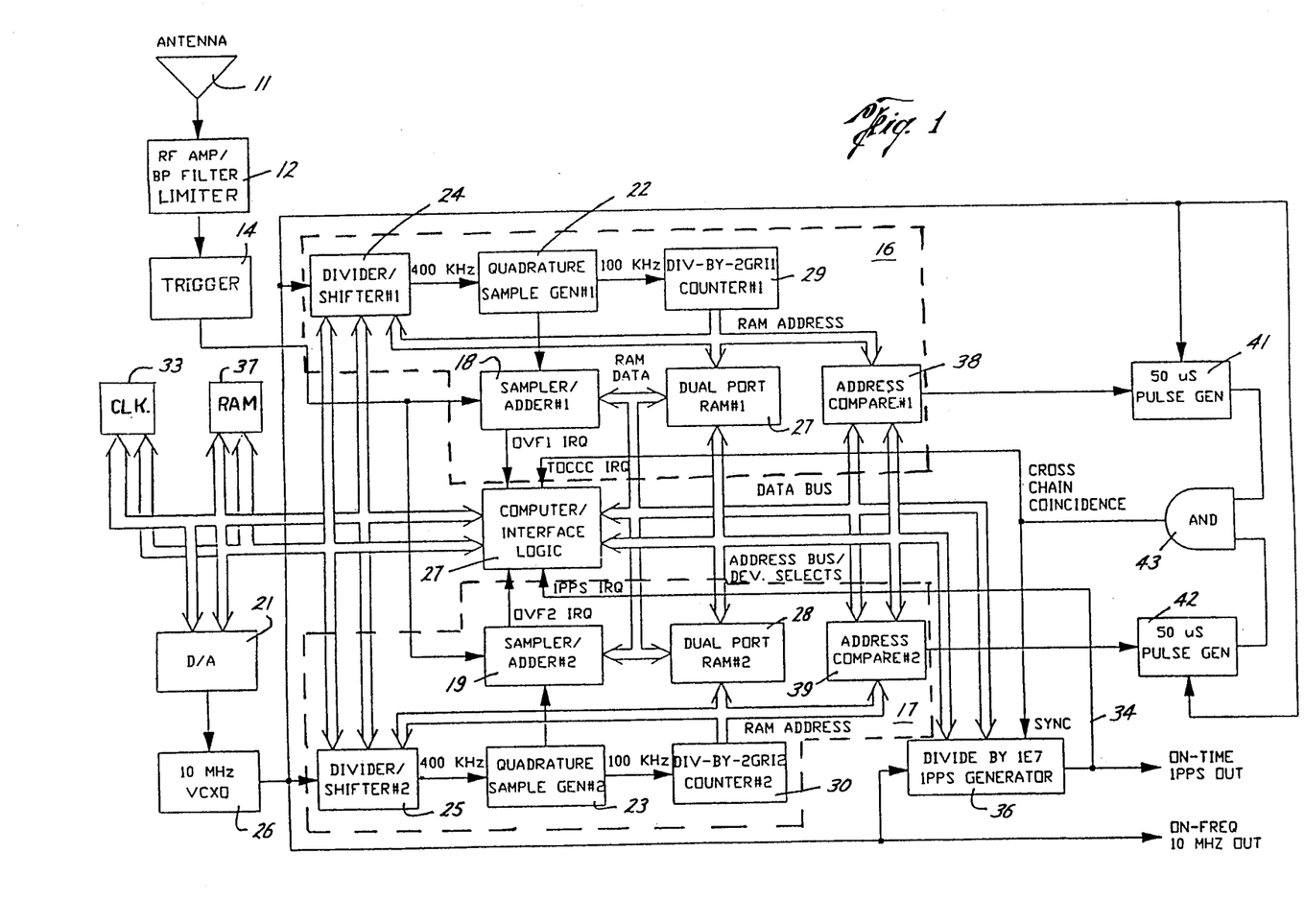
FIG. 1 is a block diagram of a Loran receiver in accordance with the present invention capable of performing the cross chain coincidence method of the present invention to determine universal coordinated time.

Referring to FIG. 1, presented is a block diagram of a Loran-C receiver architecture, in accordance with the present invention, capable of performing the cross chain coincidence method of the present invention to determine Universal Coordinated Time (UTC).

Loran-C antenna 11 produces a signal which is applied to amplifier/filter and hard limiter stage 12 which amplifies the signal within a bandwidth of approximately 30 KHz centered at 100 KHz. The amplified and filtered signal is then current mode limited which yields a 5 Volt peak to peak signal composed of atmospheric noise, noise introduced by stage 12, and Loran-C pulses, The details of amplifier/filter and hard limiter stage 12 are presented with reference to FIG. 2. The signal is then level shifted and applied to TTL Schmitt trigger device 14. Thus, the preferred embodiment employs a so-called hard limited front end, which is an approach that reduces the amount of high speed processing required to perform calculations on incoming Loran-C pulses. However, it will be understood that linear front end designs are also acceptable, and that the use of a linear front end should not be considered to depart from the spirit and scope of the present invention.

The hard-limited TTL level signal produced by Schmitt trigger device 14 is applied to first and second identically configured Loran-C processing channels 16 and 17.

Within each channel, the hard-limited TTL level signal is sampled by applying it to the D input of D flip-flops 18, 19 which are clocked by the sum of two 100 KHz pulse trains spaced 2.5 microseconds apart, appearing on clock lines 20 and 21. These quadrature pulse trains appearing on lines 20 and 21 are synthesized by quadrature sample generators 22 and 23 from 400 KHz clock signals produced by controllable clock dividers 24 and 25. Clock dividers 24 and 25 derive their respective 400 KHz clock signals from 10 MHz local oscillator 26. In operation, and as explained in more detail with reference to the flow chart of FIGS. 3–7, controllable clock dividers 24 and 25, under control of microprocessor 27, time-shift the quadrature samples derived from the 10 MHz clock produced by local oscillator 26 in units of 100 nanoseconds by varying the divide modulus of controllable clock dividers 24 and 25 over a range of autocorrelation RAM addresses corresponding to the time of arrival of the signals from each transmitter. In this way, a single time shifter can adjust the sampling times for the signals for each transmitter in the chain.

The hard-limited samples produced by D flip-flops 18 and 19 are first processed by integrating two successive Group Repetition Interval (GRI) blocks of data in each channel so as to match filter to the fundamental modulation of the Loran-C transmissions being processed by each channel. Performing the acquisition filtering in this way reduces the input data rate and arithmetic processing load on microprocessor 27.

Specifically, the sampled data stream produced by D flip-flops 18 and 19 (2 samples 2.5 microseconds apart every 10 microseconds) is autocorrelated in two 32K×8 random access memories (RAMs) 28 and 29. Autocorrelation RAMs 28 and 29 are addressed by divide-by-2 GRI counters 29 and 30, which results in a correlation lag of two GRIs. The contents of the current location in autocorrelation RAMs 28 and 29 are either incremented or decremented depending on the value of the current sample produced by D flip-flops 18 and 19 which lags the previous sample by two GRI's. This autocorrelation continues over many two GRI periods either until microprocessor 27 interrupts to read autocorrelation RAMs 28 and 29, or until an adder over/under flow occurs while performing an accumulation. Such an over/under flow will generate an interrupt to microprocessor 27. After reading autocorrelation RAMs 28 and 29, microprocessor 27 re-initializes autocorrelation RAMs 28 and 29, and enables the hardware to begin another accumulation synchronous with the next two GRI interval.

If the frequency dispersion of local oscillator 26 is within $10^{-7}$ of the frequency of UTC, all usable Loran-C signals will be detectable above atmospheric noise in autocorrelation RAMs 28 and 29 after about 128 GRI pairs have been accumulated.

At this point, and as explained in more detail below with reference to the flow charts of FIGS. 3–7, standard Loran-C signal processing techniques are employed over many more autocorrelation intervals to align the phase code within the received Loran-C pulses, to drive the zero crossing samples to the positive zero crossings (using controllable clock dividers 24 and 25), and to determine the location of the positive zero crossing at the end of the third cycle of the received Loran-C pulse. These operations are performed for each Loran-C channel 16 and 17.

In addition, the frequency of local oscillator 26 is adjusted to match that of the received Loran-C pulses. Adjustment of local oscillator 26 is accomplished by use of digital to analog converter 32 in order to force the sum of the zero crossing tracking time shifts for all transmitters in both Loran-C chains to zero.

Upon successful completion of the above operations, the addresses are stored in processor working RAM 37 corresponding to the samples of the zero crossings at the end of the third cycle for the first of the eight pulses received from each of the Loran-C transmitters in both the even and odd GRI's. Determination of the even and odd GRI's is by way of the phase code applied to the Loran-C pulses. The addresses stored in processor working RAM 37 are coarse (±5 microseconds) time of arrival relative to the receiver clock modulo (2 GRI). In addition, the time offsets, which control quadrature sample generators 22 and 23 are known. These time offsets are accurate to 100 nanoseconds relative to the frequency corrected 100 KHz sample pulse trains applied by quadrature sample generators 22 and 23 to D flip-flops 18 and 19 in order to maintain the timing of the samples at the zero crossings of the received Loran-C pulses. These time offsets constitute fine resolution times of arrival relative to the receiver clock modulo 10 microseconds.

Upon powering of the receiver shown in FIG. 1, microprocessor 27 either reads the date and time from an internal, inexpensive, battery powered crystal real time clock 33, or prompts the receiver operator for that information. Microprocessor 27 then maintains time from the one pulse per second interrupt appearing on line 34, produced by 10 MHz local oscillator 26 applied to clock divider 36.

In addition, as explained in more detail below with reference to the flow chart of FIGS. 3–7, microprocessor 27 also checks its battery backed processor working RAM 37 to determine if a receiver latitude and longitude are stored. The operator is again prompted if no receiver position is known. If at least three Loran-C transmitters are receivable, the receiver will determine the receiver position providing that the Position Dilution of Precision (PDOP) (a measure of the reliability of the receiver/transmitter geometry for determining position), is not greater than 10.

Ultimately, in accordance with the present invention, if the position of the receiver is accurate to less than 5 miles, and the time maintained by real time clock 3 is accurate to less than one-half of the Cross Chain Coincidence Interval (CCCI) of the Loran-C chains with the best signal to noise ratio (which the receiver determines from its Loran-C transmitter database and receiver position), then correcting real time clock 33 to universal coordinated time, in accordance with the cross chain coincidence (CCC) method of the present invention, may be performed.

After performing the signal processing functions explained above necessary to establish the time of arrival of the zero crossing at the end of the third cycle of all usable transmissions from each Loran-C chain, microprocessor 27 calculates the times of transmission based both on the receiver delay, and on the calculation of the propagation delays between the receiver and transmitters. Receiver delay is easily measured, and the propagation delays may be calculated using the techniques described in Laurila, Simo H., *Electronic Surveying and Navigation*, John Wiley & Sons, New York, pp. 212–218, 1976, and in Johler, J. R., et al., "Phase of Low Radio Frequency Groundwave," NBS Circular 573, 1956. Next, the emission delays of the secondary transmissions in each Loran-C chain are used to remove the biases from their transmission times relative to their masters. These pseudo-transmission times are averaged with the master transmission times to yield improved estimates of the transmission times of the master transmitters. This averaging may, depending upon the geometry of the transmitter to receiver paths, reduce the impact of receiver position error on both detecting CCC and on the ultimate time transfer accuracy.

For each Loran-C chain, processor 26 determines the addresses within autocorrelator RAMs 28 and 29, and the sample time shifts being generated by controllable clock dividers 24 and 25, relative to the accurately on-frequency 100 KHz pulse train, which correspond to the computed transmission times at the beginning of the first Loran-C pulse (the UTC coincident point on the Loran-C pulse), not the third cycle, in both Phase Code A and B GRI's. The appropriately phase coded GRI is determined from the computation of the next Time of Cross Chain Coincidence (TOCCC) and whether this time corresponds to an even or odd GRI for each of the Loran-C chains. For each chain, the combination of these coarse and fine resolution settings corresponds to the estimated transmission time of the beginning of the first pulse of the master transmitter in the appropriately phase coded GRI relative to receiver time modulo (2 GRI).

Microprocessor 27 then writes these addresses to one side of 16 bit logical comparators 38 and 39. The other side of each comparator 38 and 39 is connected to the address bus of the respective autocorrelator RAM 28 and 29. Microprocessor 27 then controls controllable clock dividers 24 and 25 for each channel to apply the previously determined offsets from the accurately on-frequency 100 KHz sample pulse train during the times of transmission (during normal tracking they are only applied at the time of arrival). The outputs of comparators 38 and 39 are pulses 10 microseconds wide, repeating every 2 GRI's, with rising edges corresponding to the transmission times of the master transmitters in each Loran-C chain. These pulses are applied to 50 microsecond digital pulse generators 41 and 42, which stretch the length of each of the pulses to 50 microseconds. The outputs of pulse generators 41 and 42 are applied to the inputs of AND gate 43. When CCC occurs, the two pulses generated by pulse generators 41 and 42 overlap for some period of time, provided that all conditions concerning position and time initialization have been met. This overlap will generate an output pulse from AND gate 43, which is used to synchronize clock divider 36, and which is used as an interrupt for microprocessor 27.

Upon receiving this TOCCC interrupt, microprocessor 27 determines if the CCC appeared within one-half of the CCCI of the calculated TOCCC. If so then a successful CCC synchronization has occurred. At this time, microprocessor 27 writes the proper offset modulus into clock divider 36 to move the output of clock divider 36 from the CCC time, which will not necessarily fall on an even UTC second, to either the next UTC second if the TOCCC subseconds were less than 0.5, or to the second after the next UTC second if the TOCCC subseconds were greater than or equal to 0.5. Also at this time, microprocessor 27 sets the receiver whole seconds time equal to the calculated TOCCC rounded to the nearest second. One second after this TOCCC interrupt, divider 36 generates a 1 PPS interrupt and also loads the new divide modulus. The 1 PPS interrupt service routine now reloads the normal modulus into divider 36 so that only a single TOCCC subseconds adjustment is performed. At the next 1 PPS interrupt, the adjustment has been implemented and the receiver output 1 PPS is accurately set to UTC.

Figure 2:
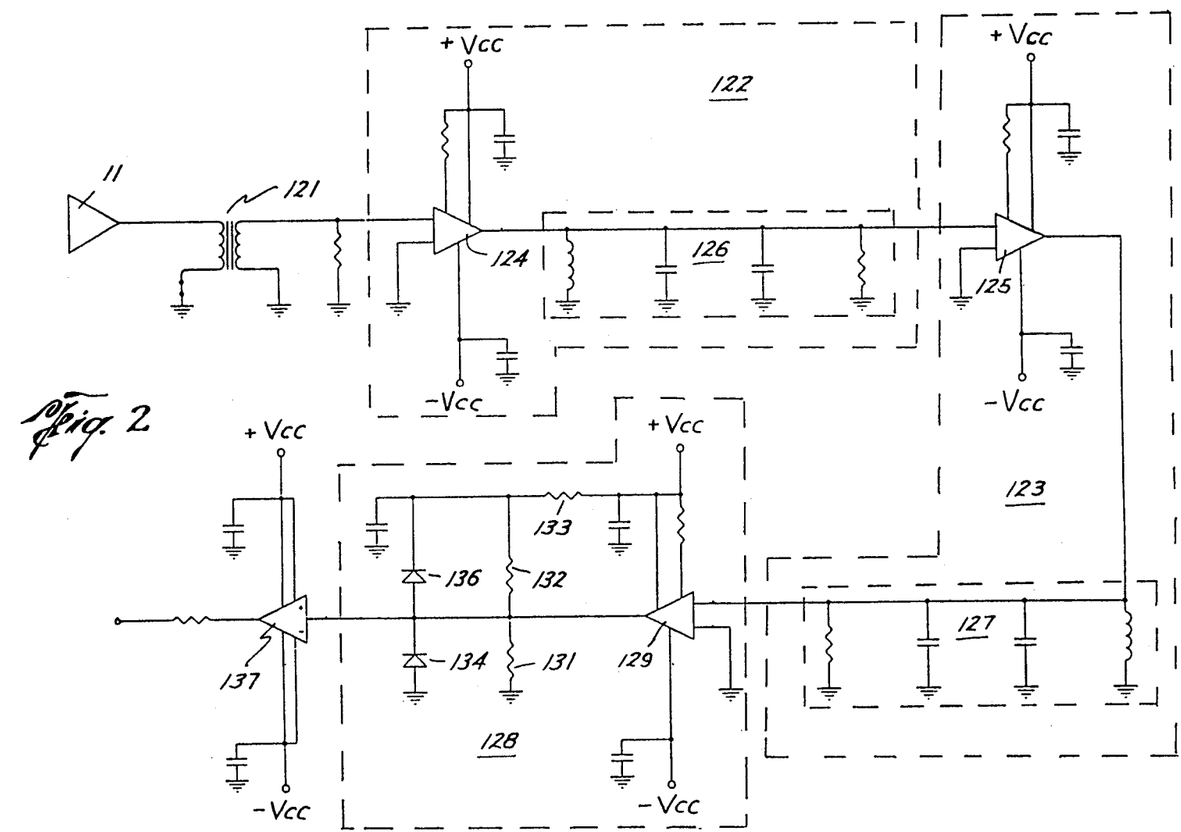
FIG. 2 is a detailed schematic of the front end of the Loran receiver of FIG. 1.

Referring now to FIG. 2, presented is a schematic of amplifier/filter and hard limiter stage 12 used in FIG. 1. Antenna 11 is connected to transformer 121, the output of which is applied to first and second amplifier/filter stages 122 and 123 which are connected in series. Each filter stage includes an operational transconductance amplifier 124, 125 and an RLC Network 126, 127. Each amplifier/filter stage 122, 123 is configured as a band-pass filter centered about 100 KHz with a Q of 1.5, and a gain of 32 dB. It will be understood, however, that other band-pass parameters could be used, without departing from the spirit and scope of the present invention.

Following amplifier/filter stage 123 is hard limiter stage 128 which includes operational transconductance amplifier 129, a resistive divider including resistors 131, 132 and 133, and limiting diodes 134 and 136. Operational transconductance amplifier 129 is configured to provide a gain of approximately 40 dB, and resistors 131, 132 and 133 are selected so that the output of operational transconductance amplifier 129 is clipped to produce an output signal which varies from approximately 0 to 5 volts. This signal is applied to operational amplifier 137 which is configured as a unit gain buffer amplifier.

The output of operational amplifier 137 is applied to the input of TTL Schmitt trigger device 14, shown in FIG. 1.

Table I presents exemplary sources for the elements appearing in FIGS. 1 and 2. It will be understood that other components could be substituted without departing from the scope of the invention.

TABLE I

| Element | Description | Type and Source |
|---|---|---|
| 11 | Loran-C Antenna | 2026W, Austron, Inc. |
| 14 | TTL Schmitt Trigger Device | 74HC14, available from several sources |
| 18, 19 | D Flip Flop | Constructed from XILINX Logic Cell Array XC2018-70, XILINX, Inc. |
| 22, 23 | Quadrature Sample Generator | XC2018-70, XILINX, Inc. |
| 24, 25 | Controllable Clock Divider | XC2018-70, XILINX, Inc. |
| 26 | Local Oscillator | 1121, Austron, Inc. |
| 27 | Microprocessor | MC68008, Motorola, Inc. |
| 28, 29 | Autocorrelator RAM | TC55257BSPL-85, Toshiba |
| 30, 31 | Divide-by-2 GRI Counter | XC2018-70, XILINX, Inc. |
| 32 | D/A Converter | 12-bit, Analog Devices |
| 33 | Real Time Clock/RAM | DS1216C "Smartwatch", Dallas Semiconductor |
| 36 | Clock Divider | P8254-2, Intel Corp. |
| 37 | RAM | 256K CMOS, Hitachi |
| 38, 39 | Sixteen Bit Logical Comparator | XC2018-70, XILINX, Inc. |
| 41, 42 | 50 Microsecond Pulse Generator | P8254-2, Intel. Corp. |
| 43 | AND gate | SC2018-70, XILINX, Inc. |
| 124, 125, 129 | Operational Transconductance Amplifier | CA3080, RCA |
| 137 | Operational Amplifier | LH4001, National Semiconductor |

FIGS. 3–7 present flow charts of the method of operation of the apparatus of FIG. 1 to perform the time setting method of the present invention. In practice, the steps shown in the flow charts of FIGS. 3–7 are programmed in an appropriate language, and loaded into an appropriate portion of processor working RAM 37, in order to control the function of microprocessor 27 to perform the functions described above.

Figure 3:
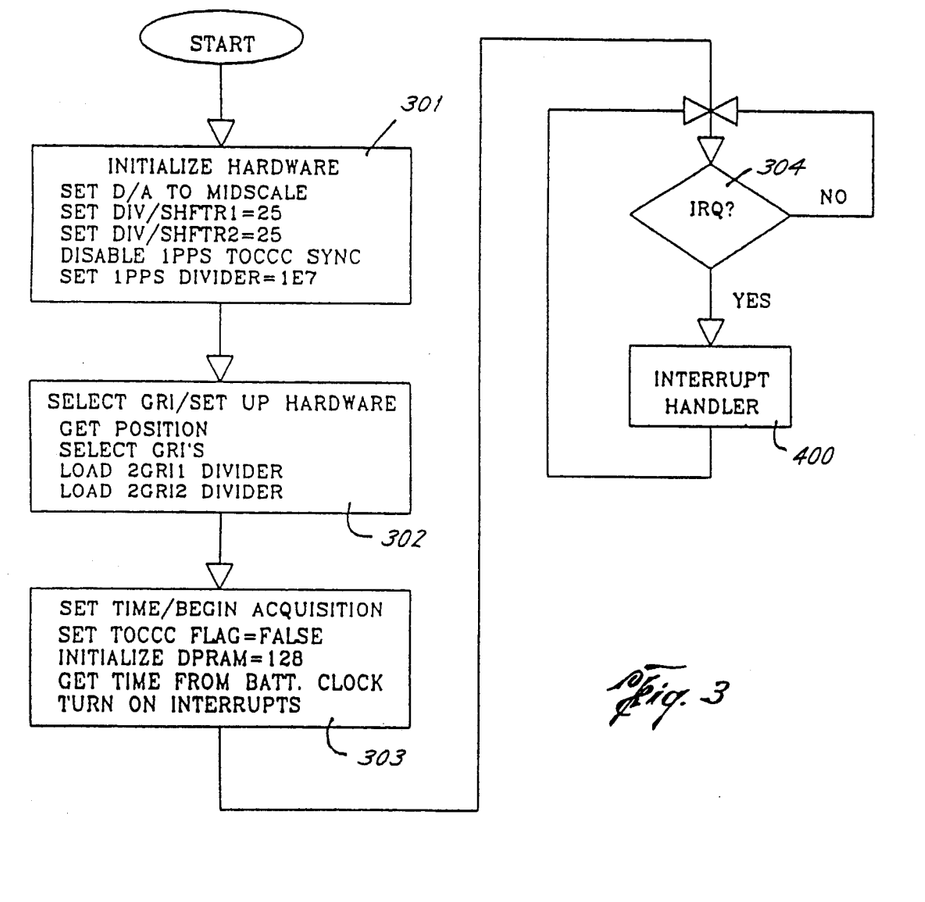
FIGS. 3-7 are flow charts of the cross chain coincidence method of determining universal coordinated time, in accordance with the present invention.

Referring to FIG. 3, the generalized flow chart of the method of the present invention is presented. After the process has started, for example, upon repowering of the receiver after a power outage, the hardware is initialized in step 301 which includes the setting of digital-to-analog converter 21 to midscale, the setting of divider/shifters 24 and 25 to divide by 25, the disabling of the 1 PPS TOCCC synchronization, and the setting of 1 PPS divider 36 to $10^7$.

Control then passes to block 302 where the receiver position is input which can be accomplished either by user input relying upon topographical maps, or other position determining methods. Alternatively, receiver position can be prestored in RAM 37 and retrieved at this time. A further alternative is for the receiver to automatically determine receiver position using standard Loran-C methods, which is possible when signals from at least three Loran-C transmitters are available and the PDOP is not greater than 10.

Also in block 302, from the position information, the particular transmitter GRI's are determined by selecting, from the receiver position information, the two Loran-C chains with the highest signal to noise ratio. Then, the divide-by-two GRI counters 29 and 39 are loaded with the appropriate divisors.

Control passes to block 303 where UTC time and the number of leap seconds since 1958 are acquired. This is accomplished by, for example, either prompting the receiver operator to input UTC time and leap seconds, or by reading battery-backed RAM/real time clock 33. As mentioned above, this initial UTC time need only be accurate to within a few seconds of actual UTC.

Also in block 303, the TOCCC FLAG is set false, dual port RAMs 27 and 28 are set to the value 128, and microprocessor 27 is enabled to receive interrupts.

Control then passes to blocks 304 and 400 which together form an interrupt handling loop. When an interrupt is detected in block 304, control passes to block 400 where the appropriate interrupt handler is exercised. The function of block 400 is shown in more detail with reference to FIG. 4.

Figure 4:
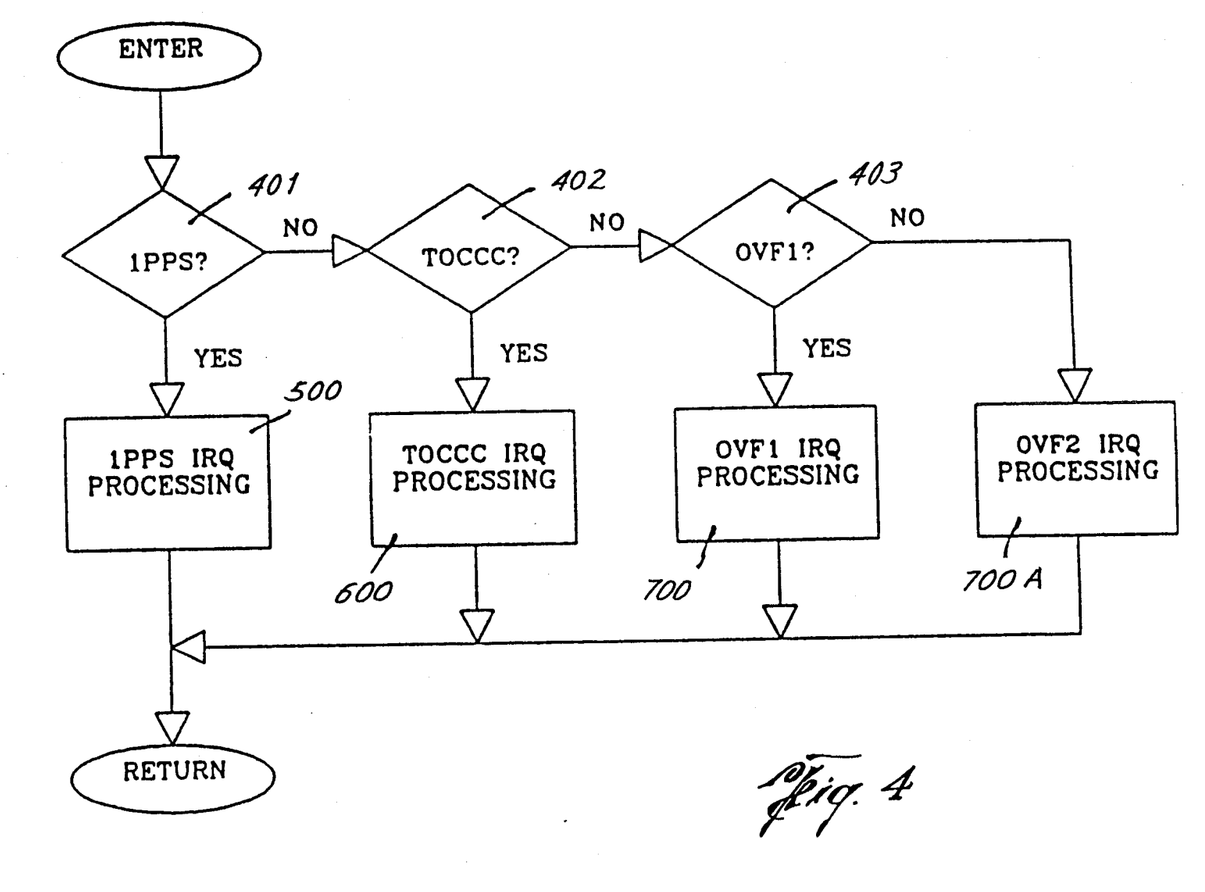

Referring to FIG. 4, after the interrupt handling routine is entered, control resides in decision block 401 where it is determined whether a 1 PPS interrupt was received. If so, control passes to block 500 where the interrupt handling routine of FIG. 5 is performed, and if not, control passes to decision block 402.

Figure 6:
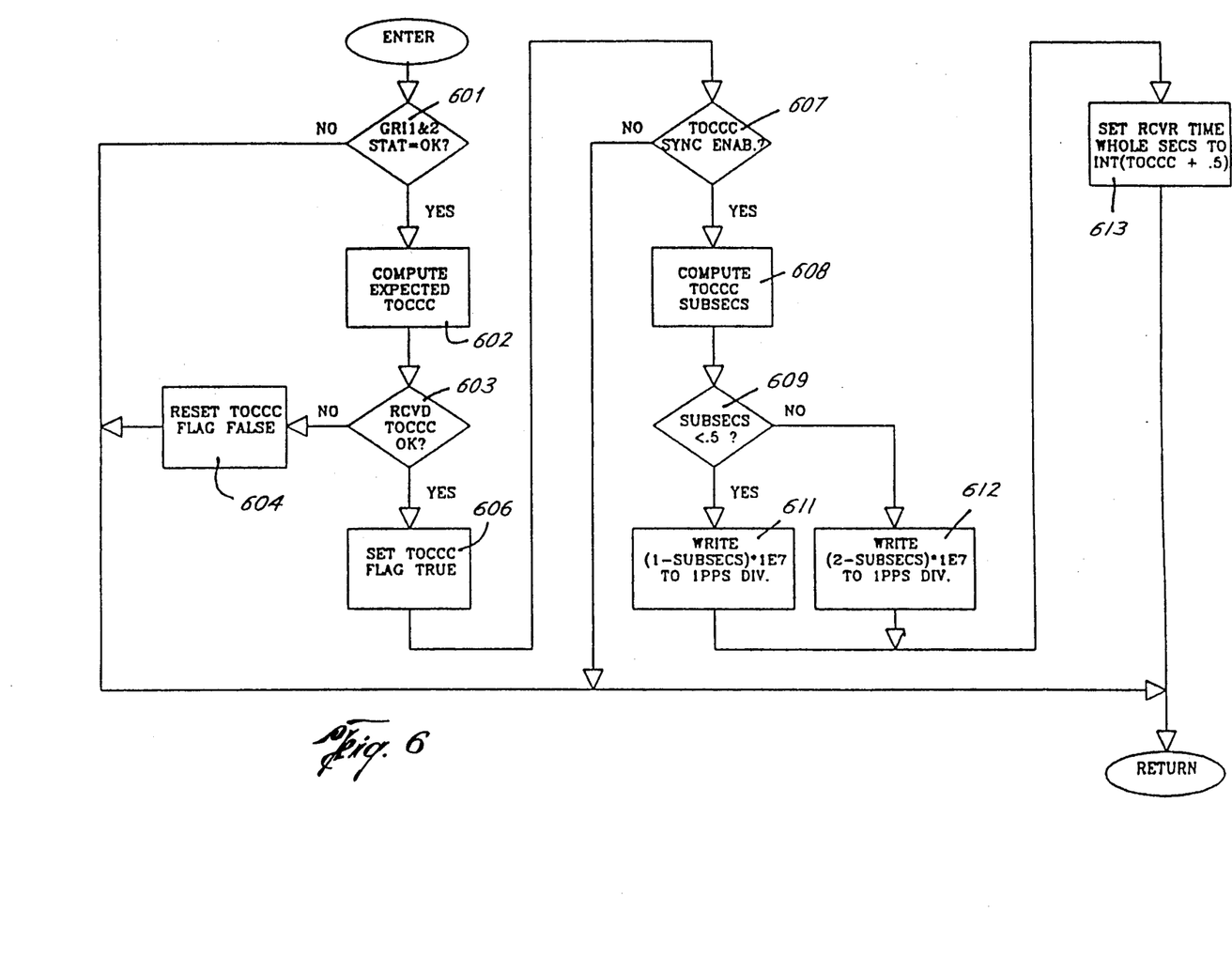

If decision block 402 determines that a TOCCC interrupt request has been received, control passes to block 600 where the TOCCC IRQ routine is performed, which is shown in more detail with reference to FIG. 6.

When decision block 403 is entered, it is determined whether overflow from adders 18 or 19 has occurred. Control then passes to either block 700 or 700A which processes the overflows in blocks 700 or 700A using the routine in FIG. 7.

Figure 5:
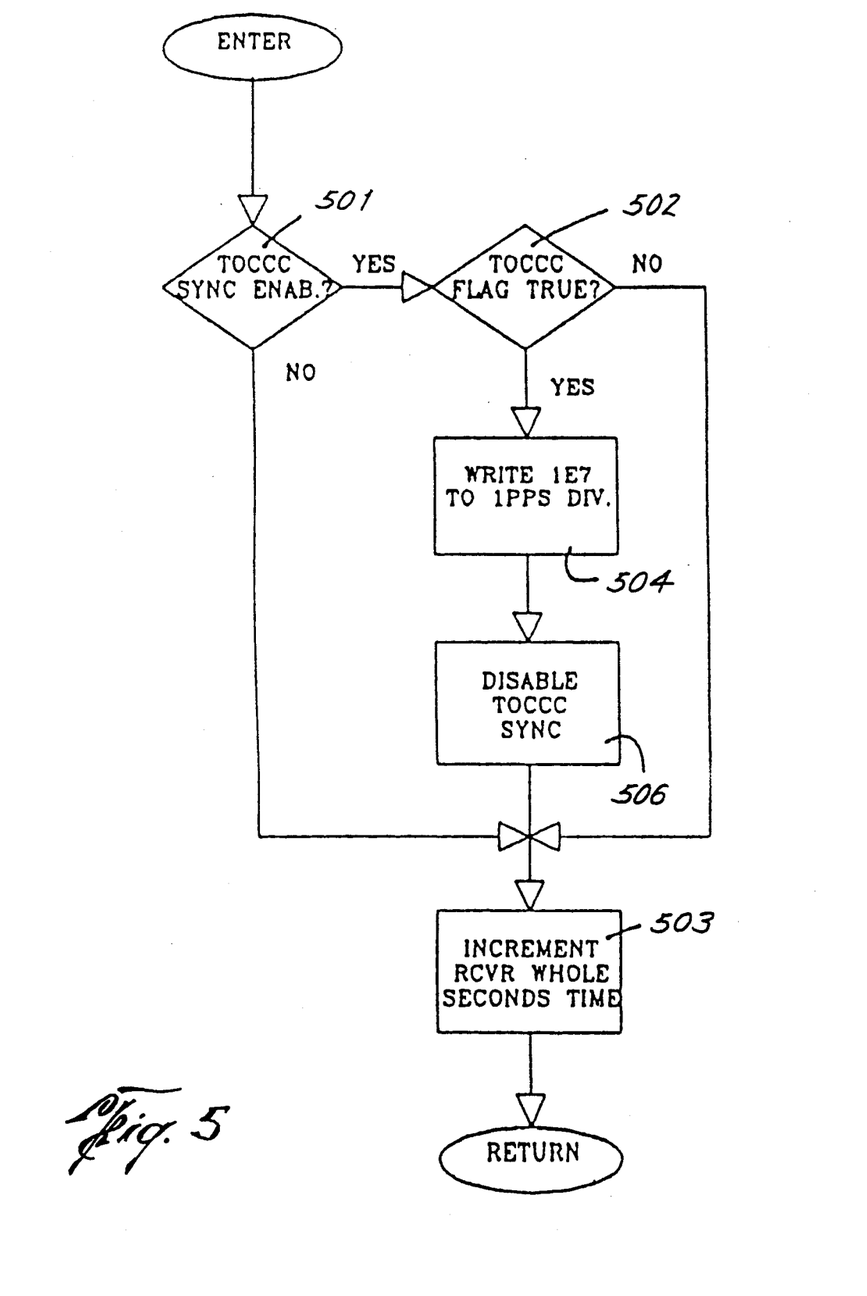

Referring now to FIG. 5, the 1 PPS IRQ handling routine is presented. Beginning in block 501, it is determined whether TOCCC synchronization is enabled. If so, control passes to block 502, and if not control passes to block 503 where the whole seconds time, maintained by real time clock 33 is incremented. If decision block 501 determines that TOCCC synchronization is enabled, control passes to block 502 where the TOCCC flag is tested, if it is false, control passes to block 503. If the TOCCC flag is true, control passes to block 504 where $10^7$ is written to 1 PPS divider 36. Control then passes to block 506 where TOCCC synchronization is disabled, and then on to block 503.

Referring now to FIG. 6, the TOCCC IRQ handling routine is presented. Beginning in decision block 601 it is determined whether the status of GRI1 and GRI2 is "OK". Tracking status on both GRI's must be "OK" to enable TOCCC synchronization. If status does not check, control is returned, otherwise control passes to block 602 where the expected TOCCC is computed, as a function of GRI1 and GRI2. Control then passes to block 603 where it is determined whether the expected TOCCC matches the received TOCCC, and if not, control passes to block 604 where the TOCCC flag is set false, and control returns.

If decision block 603 determines that the received TOCCC matches the computed TOCCC, control passes to block 606 where the TOCCC flag is set true. Then, in decision block 607, TOCCC synchronization is tested to determine whether it is enabled, and if not, control returns. Otherwise, control passes on to block 608 where the TOCCC subseconds are computed, by subtracting TOCCC whole seconds from the TOCCC. Then, in block 609, the subseconds determined in block 608 are compared to 0.5 seconds. If the subseconds are less than 0.5 seconds, depending on the comparison results of decision block 609, control passes to either block 611 or 612 where the divisor in divider 36 is set, in accordance with the rounding equations presented in those blocks. Then, in block 613, the whole seconds of real time clock is set to the integer value of TOCCC plus 0.5 seconds.

Figure 7A:
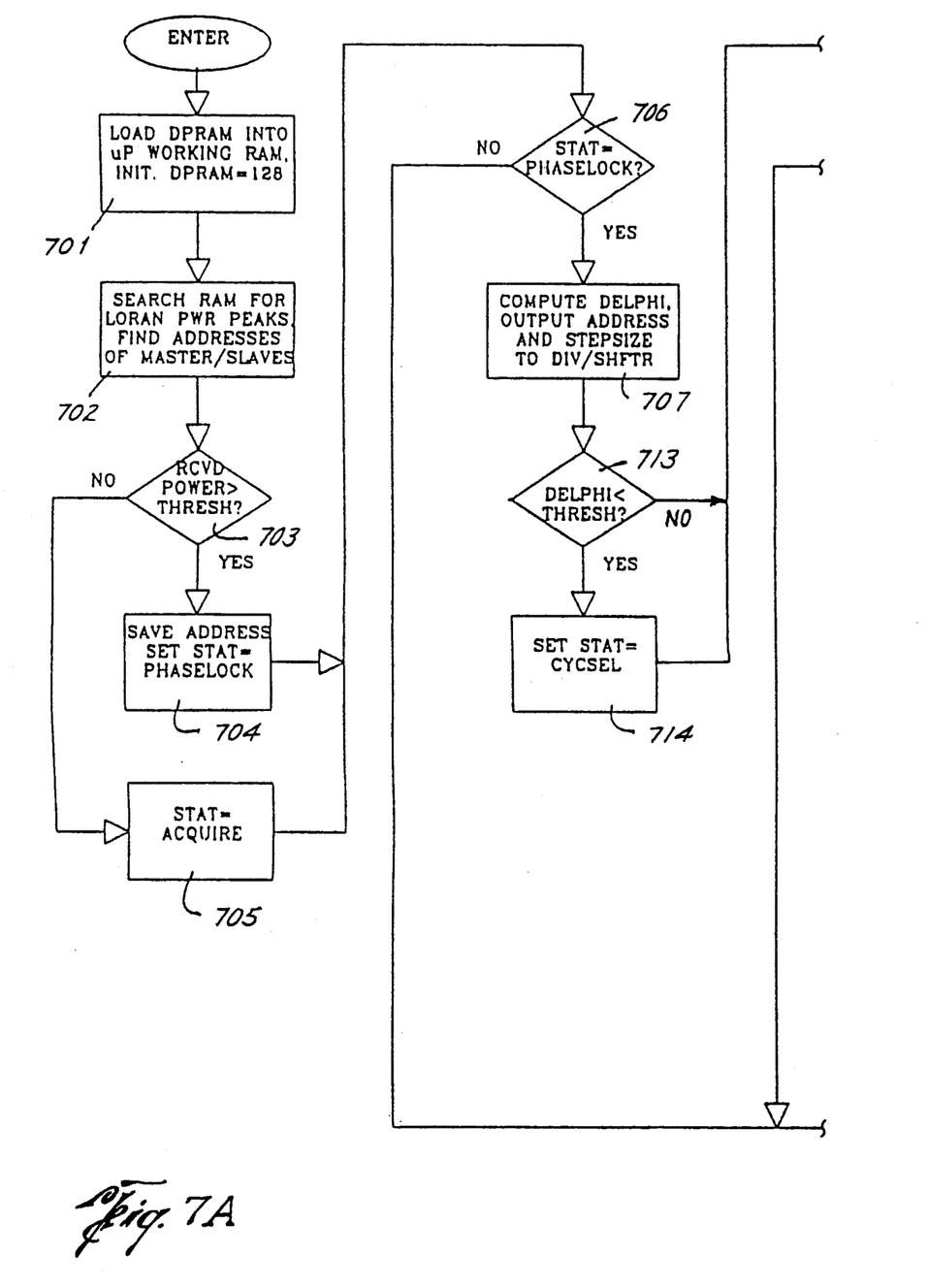
Figure 7B:
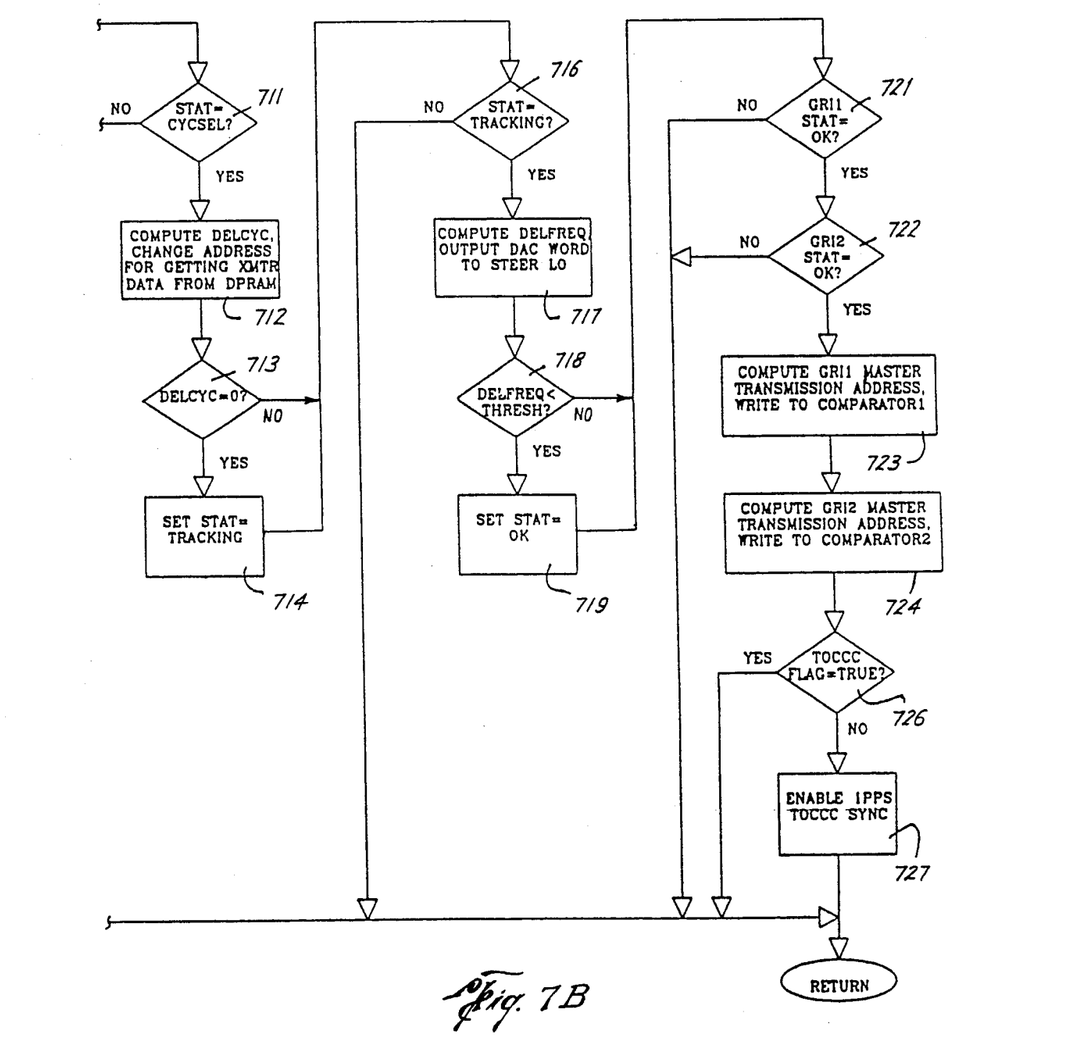

Referring now to FIGS. 7A and 7B, the interrupt handling routine that processes an overflow of adder 18 or adder 19 is presented. The following description of the process depicted by FIG. 7 will be with respect to adder 18 which processes the signals received from the first Loran-C transmitter at the first Group Repetition Interval (GRI1). It will be understood that the same procedure is followed when adder 19 overflows during the processing of GRI2.

Beginning in block 701, the contents of dual port RAM 27 are loaded into the working RAM of microprocessor 27. Then, in block 702, RAM 37 is searched for the Loran power peaks and addresses of the master and slave transmitters for the particular chain being processed. Then, in block 703 it is determined whether the received power exceeds a predetermined threshold. If not, indicating that the received power is insufficient to acquire satisfactory GRI data, control passes to block 705 where status is set to ACQUIRE, which indicates that insufficient GRI data has yet to be acquired. If, on the other hand, decision block 703 determines that the received power exceeds the predetermined threshold, control passes to block 704 where STATUS is set to PHASELOCK.

Then in decision 706, STATUS is checked to determine whether it is PHASELOCK. If not, indicating that STATUS is still set to ACQUIRE, control is returned. If decision block 706 determines that STATUS is PHASELOCK, control passes to block 707 where the phase error (DELPHI) is computed, and the address and step size are output to divider/shifter 24. DELPHI is computed based on the relationship of the quadrature samples; the early sample is driven to the zero crossing and the 2.5 $\mu$S later sample to the positive peak. Then, in decision block 708, it is determined whether DELPHI is less than a predetermined threshold, indicating that the phase of the samples relative to the received Loran transmission is correct. If so, control passes to block 709 where STATUS is set to CYCSEL.

Control then passes to decision block 711 where status is checked to determine whether it is equal to CYCSEL, indicating that the phase checking performed by blocks 706-709 has been satisfactorily performed. If not, control is returned. If so, control passes to block 712 where the cycle difference (DELCYC) is computed, and the address for dual port RAM 27 is changed. DELCYC is computed based on the relative amplitudes of the peak quadrature samples. Control then passes to decision block 713 it is determined whether DELCYC is equal to 0, and if so, control passes to block 714 where STATUS is set equal to TRACKING.

Control then passes to decision block 716, where STATUS is checked to see if it is equal to TRACKING, indicating that the cycle select routine of block 711-714 has been successfully completed. If not, control is returned, and if so, control passes to block 717 where the difference in frequency (DELFREQ) is computed and digital-to-analog converter 21 is adjusted to set the local oscillator 26 on frequency with UTC. Control then passes to decision block 718 where DELFREQ is compared against a predetermined threshold. If DELFREQ is less than the predetermined threshold, control passes to block 719 where the GRI STATUS (in this case, GRI1) is set to OK, indicating that the GRI computations have been successfully completed, and accurate TOCCC synchronization is possible.

In other words, within the routine of FIGS. 7A and 7B, block 701-705 determine whether the power of the receive Loran-C transmission is adequate. Only when the power is determined to be adequate, does control pass to block 706-709 which determine whether the phase of the samples of the Loran-C transmission is proper. Only when the phase is proper, can blocks 711-714 determine that the proper cycle has been selected. Only when the proper cycle has been selected, do decision blocks 716-719 determine that the frequency of the local oscillator relative to the received Loran-C transmission is adequate. Only when these four parameters are determined, is STATUS set to OK.

Then, decision blocks 721 and 722 check the STATUS of each of GRI1 and GRI2. Only when the status of each of the GRI1 and GRI2 are OK, does control pass to block 723.

In block 723, the transmission address for the master transmitter of GRI1 is computed and written to comparator 38. Then, in block 724, the transmission address for the master transmitter of GRI2 is computed and written to comparator 39.

Control then passes to decision block 726 where the TOCCC flag is tested to determine whether it is true, and if so, control is returned. If the TOCCC flag is false, control passes to block 727 where the 1 PPS TOCCC synchronization is enabled.

Thus, in accordance with the present invention, UTC time can be determined within a few microseconds of UTC. The CCCI is the least common multiple (LCM) of the two prime factored GRI's in units of 100 microseconds, and is calculated by dividing the product of the two GRI's by their GCD. Knowledge of the Loran-C common epoch for all chain GRI's, the CCCI, the UTC to less than one-half of the CCCI (typically from 13 to 86 seconds), and the number of leap seconds which have occurred since New Year 1958, allows unambiguous determination of the UTC at the next CCC.

Since the GRI's of different Loran-C chains differ by integer multiples of 100 microseconds, near coincidences between the various chain pairs may occur differing from the true coincidences by only 100 microseconds. In order to distinguish these near coincidences from the true coincidences, it is necessary to know that the propagation path delays are in error by less than $\pm 25$ microseconds. This arises from the worst case possibility that the receiver lies between and on an a line connecting two Loran-C transmitters, and that the position error is along this line. Under these conditions, with the position error equal to 25 microseconds, the difference in the two times of arrival would be 50 microseconds, both for the case of coincidence and for a near miss of 100 microseconds (in the appropriate direction to obtain position error cancellation). If the position error is reduced below 25 microseconds, then the difference between the two times of arrival would be less than 50 microseconds for true times of coincidence and greater than 50 microseconds for near misses. A threshold of plus or minus 50 microseconds in the difference of times of arrival will allow detection of the true Time of Coincidence and rejection of near misses.

Access to a dual rated Loran-C transmitter removes the limitation on position error for detecting CCC. This is because all position and path errors are equal for the same transmitter transmitting at two GRI's. This fact insures that the CCC will be unambiguously detectable, regardless of receiver position. However, the ultimate transfer accuracy is still limited by the accuracy of the propagation path delays calculated by the receiver.

The foregoing embodiment allows accurate setting to UTC using two Loran-C transmissions. However, the present invention is applicable to set UTC using two or more Loran-C transmissions.

For example, with three Loran-C transmitters, each broadcasting with three different GRI's (GRI1, GRI2 and GRI3), the Cross Chain Coincidence Interval are computed between GRI1 and GRI2 ($CCCI_{1-2}$) and between GRI3 and GRI2 is ($CCCI_{3-2}$). These are computed as with the two-chain method of the present invention, by finding the greatest common divisor between each pair and dividing their product by it. The same procedure is now applied to the two CCCI's, i.e. the Compound CCCI is equal to the product of the two CCCI's divided by their GCD.

From the CCCCI, the next Time Of Compound Cross Chain Coincidence can be calculated (TOCCCC) and compared with the next actual Compound Cross Chain Coincidence (CCCC). From this comparison, as in the two-chain method, UTC can be determined.

Using the three-chain method of the present invention, local time need be known only to within the range of 3,960 to 85,684 seconds of UTC. If more than three Loran-C chains are used (for example, signals from two dual-rated Loran-C transmitters), the uncorrected initial time accuracy can be even more relaxed.

Although the present invention has been described with reference to certain embodiments, it will be understood by those of skill in this art that additions, deletions, and changes can be made to the disclosed embodiments, without departing from the spirit and scope of the present invention.

What is claimed is:

1. A method of correcting a time keeping device, comprising:
   providing an uncorrected time keeping device;
   receiving a plurality of Loran-C transmissions having respective group repetition intervals;
   calculating a cross chain coincidence interval between each pair of said plurality of group repetition intervals; and
   correcting said uncorrected time keeping device based on said cross chain coincidence interval.

2. The method of claim 1, said correcting step comprising:
   calculating a next time of cross chain coincidence from said cross chain coincidence interval;
   detecting a next cross chain coincidence;
   comparing said next calculated time of cross chain coincidence with said detected next cross chain coincidence; and
   correcting said uncorrected time keeping device based on said comparison.

3. The method of claim 1, wherein said receiving step comprises receiving first and second Loran-C transmissions having respective first and second group repetition intervals.

4. The method of claim 1, wherein said receiving step comprises receiving first, second and third Loran-C transmissions having respective first, second and third group repetition intervals.

5. The method of claim 1, said step of calculating said cross chain coincidence interval comprising:
   determining a greatest common divisor between each pair of group repetition intervals; and
   calculating a product of each pair of group repetition intervals and dividing it by the respective greatest common divisor to obtain the cross chain coincidence interval.

6. The method of claim 5, said step of calculating said cross chain coincidence interval further comprising:
   determining a greatest common divisor between each pair of cross chain coincidence intervals; and
   calculating a product of the two cross chain coincidence intervals and dividing it by the greatest common divisor to obtain a compound cross chain coincidence interval.

7. A method of determining Universal Coordinated Time, comprising:
   receiving a plurality of Loran-C transmission having respective group repetition intervals;
   calculating a cross chain coincidence interval between each pair of said plurality of group repetition intervals; and
   determining Universal Coordinated Time based on said cross chain coincidence interval.

8. The method of claim 7, said determining step comprising:
   calculating a next time of cross chain coincidence from said cross chain coincidence interval;
   detecting a next cross chain coincidence;
   comparing said calculated next time of cross chain coincidence with said detected next cross chain coincidence; and
   determining Universal Coordinated Time based on said comparison.

9. The method of claim 7, wherein said receiving step comprises receiving first and second Loran-C transmissions having respective first and second group repetition intervals.

10. The method of claim 7, wherein said receiving step comprises receiving first, second and third Loran-C transmissions having respective first, second and third group repetition intervals.

11. The method of claim 7, said step of calculating said cross chain coincidence interval comprising:
    determining a greatest common divisor between each pair of group repetition intervals; and
    calculating a product of each pair of group repetition intervals and dividing it by the respective greatest common divisor to obtain the cross chain coincidence interval.

12. The method of claim 11, said step of calculating said cross chain coincidence interval further comprising:
    determining a greatest common divisor between each pair of cross chain coincidence intervals; and
    calculating a product of the two cross chain coincidence intervals and dividing it by the greatest common divisor to obtain a compound cross chain coincidence interval.

13. An apparatus for determining Universal Coordinated Time from Loran-C transmission, comprising:
    a first Loran-C transmission receiver which receives Loran-C transmissions at a first group repetition interval, and which produces a signal indicative of said first group repetition interval;
    a second Loran-C receiver which receives Loran-C transmissions at a second group repetition interval, and which produces a signal indicative of said second group repetition interval;
    a controllable time keeping device;
    a data processor, connected to said controllable time keeping device and connected to said first and second Loran-C receivers, for calculating a time of cross chain coincidence between said first and second Loran-C transmissions based upon said signals indicative of said first and second group repetition intervals; and a detector for detecting an actual cross chain coincidence between said first and second Loran-C transmissions;

said data processor controlling said controllable time keeping device to be substantially synchronized with Universal Coordinated Time, based upon a comparison between said calculated time of cross chain coincidence and said actual time of cross chain coincidence.

14. The apparatus of claim 13, further comprising a comparator for comparing said calculated time of cross chain coincidence with said actual time of cross chain coincidence, and for producing an indication of coincidence, said data processor controlling said controllable time keeping device based upon said indication of coincidence.

15. The apparatus of claim 13, further comprising:

a memory device for storing information indicative of an approximate topographical location of said apparatus, an approximate real time, and the number of leap seconds that have occurred since 1958, said data processor using said information, in combination with said signals indicative of said first and second group repetition intervals, to control said time keeping device to be substantially synchronized with Universal Coordinated Time.

* * * * *